(12) United States Patent
Lichtenberg et al.

(10) Patent No.: US 10,216,752 B1
(45) Date of Patent: Feb. 26, 2019

(54) DEFINING SOFTWARE INFRASTRUCTURE USING A PICTURE

(71) Applicant: Amazon Technologies, Inc., Reno, NV (US)

(72) Inventors: Kyle Adam Lichtenberg, Issaquah, WA (US); Thomas Price Jones, II, Santa Cruz, CA (US)

(73) Assignee: Amazon Technologies, Inc., Seattle, WA (US)

( * ) Notice: Subject to any disclaimer, the term of this patent is extended or adjusted under 35 U.S.C. 154(b) by 278 days.

(21) Appl. No.: 14/500,701

(22) Filed: Sep. 29, 2014

(51) Int. Cl.
*G06F 17/30* (2006.01)
*G06F 3/0484* (2013.01)
*H04N 1/00* (2006.01)
*G06K 9/62* (2006.01)

(52) U.S. Cl.
CPC .... *G06F 17/30126* (2013.01); *G06F 3/04842* (2013.01); *G06K 9/62* (2013.01); *H04N 1/00381* (2013.01); *H04N 2201/0039* (2013.01)

(58) Field of Classification Search
None
See application file for complete search history.

(56) References Cited

U.S. PATENT DOCUMENTS

| 6,112,015 A * | 8/2000 | Planas | H04L 41/22 709/220 |
| 6,314,194 B1 * | 11/2001 | Michael | G06F 17/5045 250/559.34 |
| 6,697,087 B1 * | 2/2004 | Kelly | H04L 41/22 715/734 |
| 2004/0205014 A1 * | 10/2004 | Kaltner | G06Q 30/06 705/37 |
| 2012/0158806 A1 * | 6/2012 | Snyder | H04L 67/1097 707/827 |
| 2012/0163735 A1 * | 6/2012 | Kiyoshige | H04N 1/00347 382/305 |
| 2015/0109306 A1 * | 4/2015 | Felke | G06T 11/206 345/440 |

* cited by examiner

*Primary Examiner* — Jeffrey A Gaffin
*Assistant Examiner* — John M Heffington
(74) *Attorney, Agent, or Firm* — Lee & Hayes, P.C.

(57) ABSTRACT

Functionality is disclosed herein for utilizing a picture created by a customer of a service provider network to define infrastructure associated with the service provider network or other networks. The picture may be a picture of a drawing or a model, for instance. The picture is analyzed to identify resources depicted in the picture as well as any connections between the resources. Based upon the analysis, configuration data that describes the configuration of the resources within the service provider network may be generated and used to perform one or more actions. For example, the configuration data might be used to generate a deployment template and/or used to provision the resources within the service provider network or other networks.

20 Claims, 8 Drawing Sheets

US 10,216,752 B1

DEFINING SOFTWARE INFRASTRUCTURE USING A PICTURE

BACKGROUND

Some network-based computing service providers allow customers to purchase and utilize computing resources, such as virtual machine instances, on a permanent or as-needed basis. In addition to virtual machine instances, such computing service providers typically allow customers to purchase and utilize other types of computing resources. For example, customers might be permitted to purchase access to and use of file and block data storage resources, database resources, networking resources, and other types of computing resources. Utilizing these computing resources as building blocks, customers of such a network-based computing service can create custom solutions that provide various types of functionality, such as application hosting, backup and storage, content delivery, World Wide Web ("Web") hosting, enterprise information technology ("IT") solutions, database services, and others.

It can sometimes be difficult for customers, or potential customers, of computing service providers such as those described above to define the infrastructure of an application or network. For example, a significant amount of manual technical effort may be required to define the resources to be utilized by an application as well as the interactions between resources within the network-based computing service. The technical effort required to define an infrastructure that is provisioned in a network-based computing service may be costly and time consuming and might, therefore, present a significant barrier to the utilization of network-based computing services to certain types of customers.

The disclosure made herein is presented with respect to these and other considerations.

DETAILED DESCRIPTION

Figure 1:
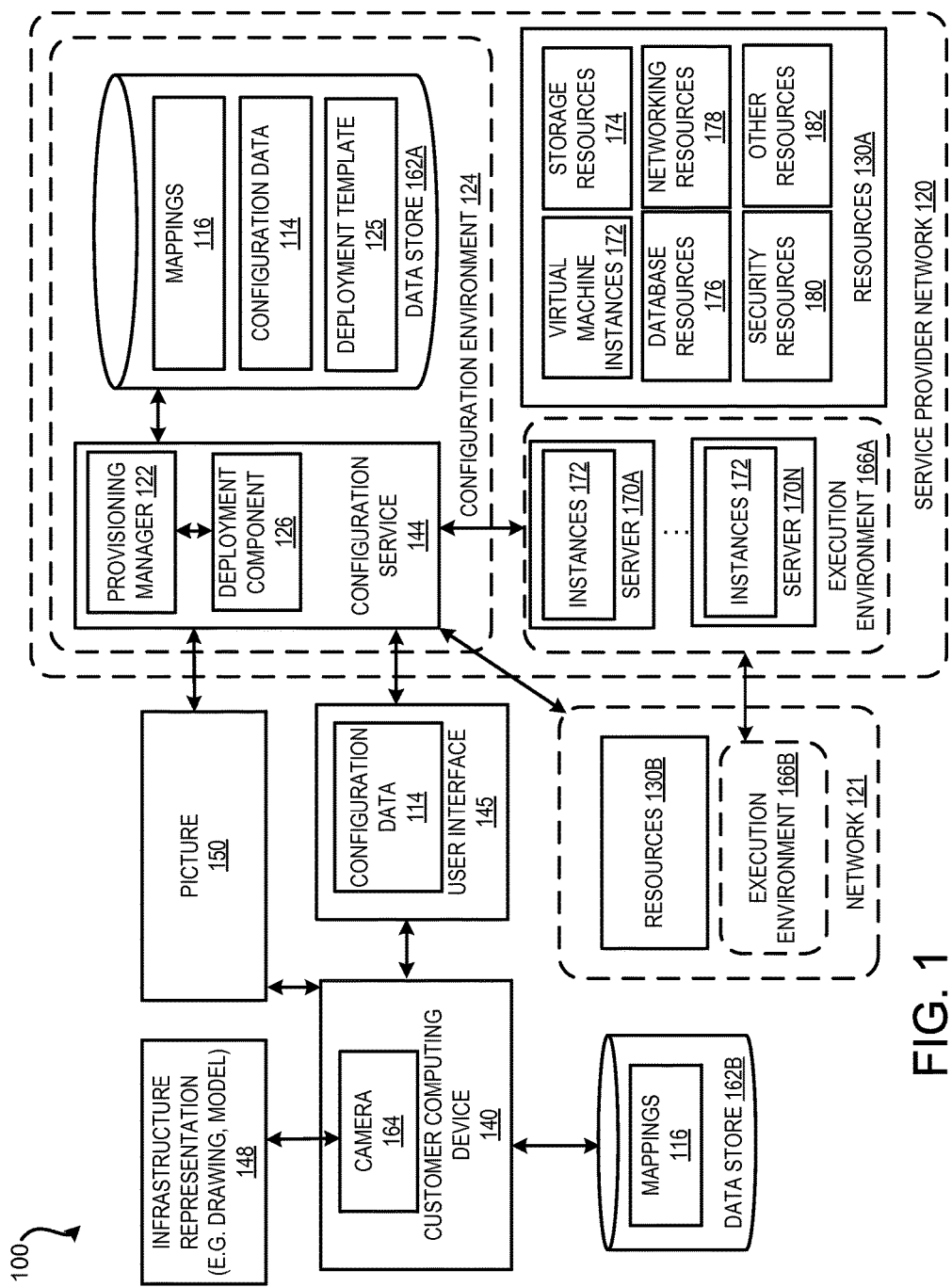
FIG. 1 is a block diagram depicting an illustrative operating environment in which a picture may be used to define an infrastructure of an application that may be provisioned in a network.

The following detailed description is directed to technologies for using an image (e.g., a picture) to define the infrastructure for an application that may be deployed in a service provider network and/or other networks. A user, such as a customer of the service provider network, may create a drawing or a model (e.g., using blocks) to define the infrastructure of an application. For example, the user might create a drawing of the desired infrastructure on a piece of paper, on a whiteboard, using a computing device, or the like. In other examples, the user might create a model (e.g., using blocks) that defines the infrastructure. After creating the drawing or the model, the user may take a picture of the drawing or model, or may obtain a screenshot when the drawing is made using a computer.

In some examples, the picture of the infrastructure may be provided to a configuration service that analyzes the picture to identify the specific resources depicted in the picture as well as how the resources are connected. The configuration service may be part of the service provider network or associated with the service provider network. After obtaining the picture of the infrastructure, the picture may be analyzed by the configuration service to associate specific drawing shapes and/or drawing attributes with resources that may be included in configuring an application that is to be deployed within a network, such as the service provider network and/or one or more other networks. For example, and without limitation, a server could be represented by a red square, a firewall may be identified as a black line, a load-balancer might be represented by another shape, and the like. As the picture is analyzed, a red square may be identified that may be mapped to an actual server in the service provider network.

In some configurations, the mappings between the drawn object and the associated resource in the service provider network may be provided, at least in part, by the service provider network. In other examples, the customer might supply custom mappings that associate drawing objects with a specified resource or type of resource available from the service provider network.

Additional details might also be associated with depicted resources. For example, a customer may associate tags (e.g., graphical or text) with a resource that may be used to further define the resource. In some examples, a tag may specify a value of a parameter that is associated with the resources (e.g., instance type, security permissions, allowed ports). For instance, in the example provided above, text could be written near the red square that identifies a size of the instance (e.g., "medium" to indicate a four core processor using 15 GB of memory). In other examples, the parameters might be set using symbols. For example, one red square near an instance resource might indicate a small instance size, whereas two red squares might indicate a medium size instance. In some examples, the customer may be prompted to supply parameters that may not have been determined from the infrastructure depicted in the picture. The picture may also be analyzed to determine the connections between the resources. For example, the connections might be indicated by lines, or some other graphical element or association that may be determined from the picture. After identifying the resources and the connections between the resources in the picture, configuration data may be generated that describes a configuration of the infrastructure of the application within the service provider network or another network as depicted in the picture.

In some examples, the configuration data may be used to generate a deployment template. In some examples, the deployment template may be used by the service provider network or another network to provision the identified resources. For example, the deployment template might be used by the service provider network to provision resources in another network that is associated with the service provider network. The deployment template might also be provided to the customer. For example, the deployment template may be provided to the customer for modification before the deployment template is used to provision or instantiate the infrastructure in the service provider network.

Once the configuration data describing the configuration of the infrastructure and/or the deployment template has been generated, portions of the configuration data or the deployment template might also be included in an appropriate interface, such as a user interface ("UI"), through which a user, such as the customer, can modify the data. For example, and without limitation, a user might be permitted to set one or more parameters of the resources identified from the picture using the UI. Other types of interfaces, such as application programming interfaces ("APIs") or command line interfaces might also be provided through which a user can modify the configuration data.

The UI might also provide functionality for modifying the configuration data in other ways. For example, a user might be permitted to add, delete, or modify virtual machine instances, or other types of data processing resources, file or block data storage resources, database resources, networking resources, such as load balancing resources, domain name service ("DNS") resources, and virtual networking resources, security resources and/or other types of resources. In some examples, the deployment template might be shared with other users. In other examples, the user may provide a deployment template to one or more other users. Additional details regarding the various components and processes described above for using a picture to define an infrastructure of an application used in a service provider network will be presented below with regard to FIGS. 1-8.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances and the like. As mentioned briefly above, the technologies described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which may be referred to herein as a "FIG." or "FIGS.").

FIG. 1 is a block diagram depicting an illustrative operating environment 100 in which a picture may be used to define an infrastructure of an application that may be provisioned in a network. As illustrated, the operating environment 100 includes a customer computing device 140, a configuration environment 124, an execution environment 166A and 166B and resources 130A and resources 130B (which may be referred to herein as "resources 130"). In some examples, the computing devices are configured to operate in a service provider network 120 and/or in the network 121.

As described in more detail below, the service provider network 120, and possibly the network 121, may include a collection of rapidly provisioned and, potentially, released computing resources hosted in an execution environment 166A or 166B. Customers of the service provider network 120 may purchase and utilize computing resources 130, such as virtual machine instance 172, networking resources 178, storage resources 174, or other types of computing resources, from a service provider on a permanent or as-needed basis. The computing resources 130A may include a number of computing, networking and storage devices in communication with one another. In some configurations, the computing resources 130A may correspond to physical computing devices, such as the servers 170A-170N. In other configurations, the computing resources may correspond to virtual machine instances, such as the virtual machine instances 172, implemented by one or more physical computing devices, such as the servers 170A-170N.

According to some configurations, the network 121 may be similarly configured to the service provider network 120. For example, the network 121 may have an execution environment 166B and the resources 130B. The resources 130B may be the same or different from the resources 130A. In some examples, the network 121 may be programmatically accessed by the configuration environment 124 and/or the execution environment 166B. For example, the configuration service 144 may configure the resources 130B in the network 121 by sending data (e.g., commands) to one or more computing resources operating in the network 121.

Each type or configuration of a computing resource may be available from the service provider that operates the service provider network 120 in different sizes. For example, a service provider might offer virtual machine instances 172 or other types of data processing resources that are available for purchase and use that have many different configurations of processor capabilities, main memory, disk storage, and operating system. A service provider might also offer other types of resources 130 for purchase and use by customers. For example, a service provider might offer file or block data storage resources 174, database resources 176, networking resources 178, such as load balancing resources, domain name service ("DNS") resources, virtual networking resources, security resources 180 and/or other types of resources 182 on a permanent or as-needed basis.

The service provider operating the service provider network 120 might also charge a fee for operating the resources 130 that the customer creates and uses within the service provider network 120. The fee charged for a particular resource 130 might be based upon the type and/or configuration of the resource 130. The fee charged for a particular resource 104 might also be based upon the amount of time the resource 130 is utilized. For example, in the case of a data processing resource, like a virtual machine instance 172, the fee for use of the resource might be charged based upon the amount of time the resource is utilized. In the case of a data storage resource 174, the fee might be computed based upon the amount of data stored and/or the amount of data transferred into or out of the resource. The fees for other types of resources 130 might also be based upon other considerations. A service provider might also utilize various purchasing models to determine the amount to charge a customer for use of resources 130 provided by the service provider.

The various resources 130 described above might also be provisioned and de-provisioned as needed in an automated fashion. For example, a customer might submit a request to the service provider network 120 to instantiate a new instance of a computing resource 130, such as an instance of a virtual machine. In response to receiving such a request, a provisioning manager 122, or one or more other components within the service provider network 120, might create the new instance of the virtual machine as requested by the customer. The customer may then be permitted to utilize the new instance of the virtual machine as desired. Other types of computing resources might be instantiated in a similar fashion.

When a customer has finished using a computing resource 130, such as a virtual machine instance 172, the customer may request that the resource 130 be de-provisioned. In response thereto, the provisioning manager 122, or another component in the service provider network 120, may cause the computing resources 130 to be de-provisioned. Other types of computing resources 130 might also be provisioned and de-provisioned in a similar manner. The service provider network 120 might also provide functionality for automatically scaling and/or de-scaling resources 130 based upon demand for the computing resources 130 or other factors.

As mentioned above, it might be difficult for the customer of a service provider network to define the infrastructure that defines the resources 130 used by an application that executes within the service provider network 120 and/or in the network 121, and possibly other networks (not shown). For instance, in the example shown in FIG. 1, a customer might be interested in creating an application that includes computing resources, such as web servers that auto-scale, a load-balancer, a firewall, and a data storage service. Manually defining the infrastructure that may be used in provisioning the resources in the service provider network 120, however, may be time consuming and error-prone for some customers. As used herein, the terms "customer" and "customers" refer to existing customers of the service provider network 120 as well as visitors (i.e. potential customers) to the service provider network 120 that are authorized to execute a virtual machine instance 172 (e.g., the instances 172A-172N) in the service provider network 120.

In order to assist a customer of the service provider network 120 in defining the infrastructure, the customer may provide a picture 150 of a desired infrastructure representation 148. As discussed briefly above, the infrastructure representation 148 might be a drawing, or model, or some other representation of the infrastructure of an application (which may all be referred to herein as a "drawing"). For example, the user might build a model using blocks of different colors and/or shapes to represent different resources 130. In some examples, the infrastructure representation 148 may include any resource 130 available from or within the service provider network 120, within the network 121, and possibly within other networks. The infrastructure representation 148 may also include the connections, such as network connections, between the resources as well as other data that includes additional details that are associated with one or more of the resources 130 depicted in the infrastructure representation 148.

After creating the drawing or the model, the customer may take a picture 150 of the drawing or model using a camera, such as camera 164, or may generate a screenshot of the drawing that may be analyzed and used to generate a definition of the infrastructure. In this way, the customer can be freed from the previously difficult task of manually defining the infrastructure. In some examples, the picture 150 of the infrastructure may be provided to a configuration service 144 that is part of, or is associated with, the service provider network 120. The configuration service 144 may receive the picture 150 from the customer computing device 140.

After receiving the picture 150, the provisioning manager 122 may analyze the picture 150, to identify the specific resources 130 depicted in the picture as well as how the resources are connected. For example, the provisioning manager 122 may analyze the picture 150 to recognize shapes in the picture 150 and associate the shapes with at least one of the available resources 130 available from the service provider network 120 or the network 121.

According to some configurations, the mappings between the shape and the associated resource 130 are stored and defined in the mappings 116 illustrated in the data store 162A and/or in the data store 162B. The mappings 116 might map any graphical shape, text, icon or some other type of graphical indicator to one or more resources 130 of the service provider network 120 and/or the network 121. Some example shapes are discussed below and illustrated in FIG. 2.

In some examples, all or a portion of the mappings 116 are supplied by the operator of the service provider network 120 and/or the operator of the network 121. For example, the service provider network 120 might supply the customer with graphical shapes (e.g., a set of icons) that might be placed in a drawing to represent the different resources 130A available from the service provider network 120. Similarly, the network 121 might provide a customer with graphical shapes that might be placed in a drawing to represent the different resources 130B available from the network 121. In other examples, the customer might supply all or a portion of the mappings 116. For example, the customer might define mappings 116 that modify previously defined mappings 116 (e.g., the mappings provided by the owner/operator of the service provider network 120 or the network 121). The mappings 116 specified by the customer might also be new mappings 116 that have not been defined (e.g. new or different symbols to represent the available resources 130). The mappings 116 might also include mappings for text, symbols, or other graphical elements that are used to specify parameters for the resources 130. For example, one symbol might indicate that a data store may be read, whereas another symbol might indicate that a data store may be read/write.

The provisioning manager 122 may also analyze the picture 150 to detect additional details relating to the infrastructure. For example, a customer might associate tags (e.g., graphical or text) with a resource 130 depicted in the picture 150 that may be used to further define the resource 130. In some examples, a tag may specify a value of a parameter that is associated with the resources (e.g., instance type, security permissions, allowed ports). For instance, text could be drawn near a red square in the picture 150 that identifies a size of the instance (e.g., "medium" to indicate a four core processor using 15 GB of memory, "small" to indicate a two core processor using 1.5 GB of memory). Further examples are provided below with regard to FIG. 2.

In some configurations, after analyzing the picture 150, the provisioning manager 122, or some other component, may query the customer for parameters that might be needed before the infrastructure may be provisioned and launched within the service provider network 120 and/or in the network 121. For example, the user interface 145 may be used to obtain the requested parameter data. In some examples, the user may be prompted to supply parameters that may not have been determined from the infrastructure depicted in the picture 150. The parameters that might be requested typically depend on the type of resource 130 that is depicted in the picture 150. For example, when the resource is a security group, the parameters generally relate to security settings. When the resource is a virtual machine instance, the parameters may relate to the type of the virtual machine instance.

Figure 2:
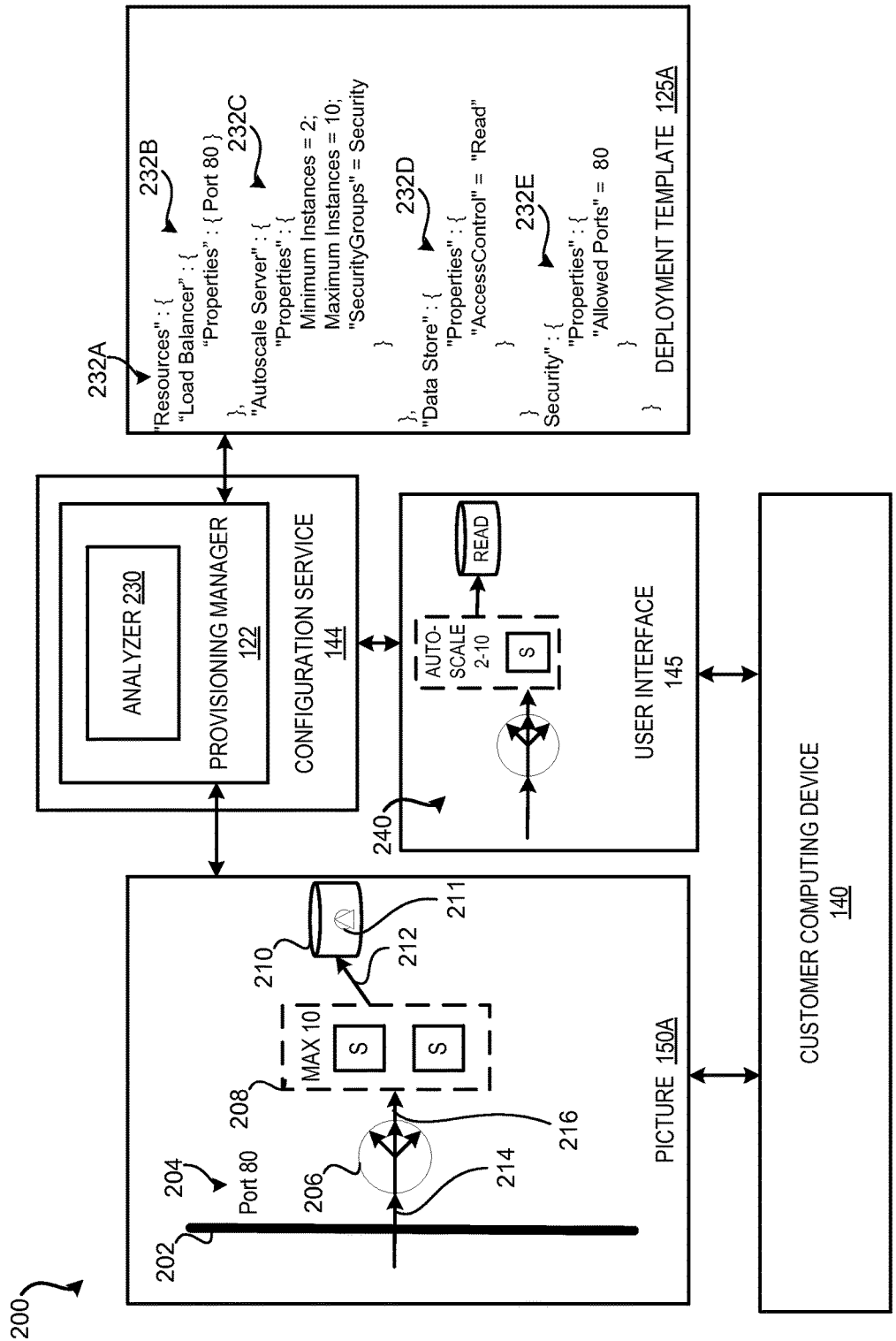
FIG. 2 is a block diagram depicting an illustrative operating environment in which a picture of an infrastructure is used to generate a deployment template.

The provisioning manager 122 may also analyze the picture 150 to determine the network connections ("connections") between the resources. For example, the connections might be indicated in the picture 150 by lines, or some other graphical element or association that may be determined from the picture 150. In some configurations, the connections may go between different networks. For example, a connection in the picture might connect one or more resources 130A provided by the service provider network 120 with one or more resources 130B provided by the network 121. After identifying the resources 130 and the connections between the resources in the picture 150, the provisioning manager 122 may generate configuration data 114 that describes a configuration of the infrastructure of the application within the service provider network 120 and/or other networks. FIG. 2 illustrates an example of an infrastructure depicted in the picture 150.

In some examples, the configuration data 114 may be used by the provisioning manager 122, the deployment component 126, or some other computing device, to generate a deployment template 125. The deployment template 125 might be implemented utilizing JavaScript Object Notation ("JSON") language, a text file, or some other suitable language. In some configurations, the deployment component 126, or another component in the service provider network 120, may utilize the deployment template 125 to provision the identified resources. In some configurations, the identified resources may be provisioned in the service provider network 120, the network 121 and possibly other networks.

The deployment template 125 might also be provided to the customer. For example, the deployment template 125 may be provided to the customer for modification before the deployment template is used to provision the service provider network 120 and/or the network 121. An example of a deployment template 125 is illustrated in FIG. 2. The customer might also share the deployment template 125 with other users.

Once the configuration data 114 describing the configuration of the infrastructure has been generated, and/or the deployment template 125 has been generated, portions of the configuration data 114 or the deployment template 125 might also be included in an appropriate interface, such as the UI 145, through which the customer, or some other authorized user, can modify the data. In particular, the UI 145 might present the resources, parameters for the resources and the connections between the resources for the infrastructure determined from the picture 150.

The UI 145 might also provide functionality for allowing a customer to enter parameters that were not included in the picture 150, or not identified correctly, for one or more resources 130 that were identified from the picture 150. A customer might also be permitted to utilize the UI 145 or other type of interface provided by the provisioning manager 122 to change and/or specify other parameters or resources.

In some examples, the deployment template 125 is generated once the customer has completed modifications to the configuration data 114, if any, using the configuration data 114. For example, and without limitation, the deployment template 125 might specify resources, parameters associated with the resources, and the like.

As briefly discussed above, a component within the service provider network 120, such as a deployment component 126, may utilize the deployment template 125 to provision and instantiate the defined resources 130 in the service provider network 120. Alternately, the deployment component 126 might utilize the configuration data 114 directly to instantiate the defined resources 130 in the service provider network 120.

FIG. 2 is a block diagram depicting an illustrative operating environment 200 in which a picture 150A of an infrastructure is used to generate a deployment template 125A. The operating environment 200 is similar to the operating environment 100. As illustrated, the environment 200 shows the configuration service 144, the customer computing device 140, the user interface 145, the picture 150A and the deployment template 125A.

The example shown in FIG. 2 is intended to be illustrative, and is not intended to be limiting. As illustrated, a user (e.g., a customer of the service provider network 120) created an infrastructure representation 148 that was used to create the picture 150A. For example, the customer may take a digital picture of a drawing or model of the infrastructure representation 148.

As depicted in the illustrative example, the picture 150A includes an infrastructure that includes a depiction of a firewall 202, a load-balancer 206, an auto-scaling group of servers 208 ("auto-scaling group 208"), and a data store 210. The firewall 202 includes text 204 that specifies to allow traffic using port 80. The firewall 202 is placed before the load-balancer 206 that is connected to the auto-scaling group of servers 208 using connector 216. The auto-scaling group 208 includes a depiction of two servers "S" that are enclosed within a dashed-line with the text "max 10." In the current example, the text "max 10" (e.g., a parameter for the auto-scaling group) may indicate that the servers should automatically scale to a maximum of 10 instances. The auto-scaling group 208 is connected to a data store 210 using a connector 212. The data store 210 includes the graphical symbol 211 indicating that data may be read from the data store 210. The graphical symbol 211 may have been created by the user or some other authorized user.

The picture 150A may be submitted to the configuration service 144 using the customer computing device 140, or some other computing device. For example, the customer might take a digital picture and upload the picture 150A to the configuration service 144. In other examples, the customer might take a picture of the infrastructure with a smart phone and transmit the picture 150A to the configuration service 144.

As discussed above, after receiving the picture 150A at the configuration service 144, the provisioning manager 122 may analyze the picture 150A to identify the defined infrastructure. In some examples, the provisioning manager 122 utilizes an analyzer 230 that is configured to identify shapes, connectors and text in the picture 150A. As discussed above, the shapes may be associated with the mappings 116 that define how shapes are translated to resources 130 within the service provider network 120. For instance, in the current example, a solid black line that is at least a specified thickness may be identified as the firewall 202. Similarly, a circle with two or more arrows might be recognized as the load-balancer 206. Generally, any mapping between shapes that are included in the picture 150A and resources 130 of the service provider network 120 might be utilized.

The analyzer 230 may also be configured to perform optical character recognition on the picture 150A to identify text elements. In some examples, the text elements may identify the resources 130. In other examples, the text elements may identify and/or define one or more parameters that are associated with one or more of the depicted resources 130. In the current example, the test "port 80" (204) is identified by the analyzer 230 and associated with the firewall 202. The text "max 10" is identified by the analyzer 230 and may be associated with the auto-scaling group 208 due, at least in part, on the location of the text "max 10" (e.g., within the auto-scaling group 208). In some examples, the text is associated with a resource based on a positioning (e.g., proximity) of the text to the depicted resource. In other examples, the text may be associated with the depicted resource based on some other identifying attribute (e.g., an arrow pointing from the text to the resource). As illustrated, the data store 210 includes the graphical symbol 211 indicating that data may be read from the data store 210. In other examples, the graphical symbol 211 might be replaced by text (e.g., an "R") indicating that data may be read from the data store 210.

After identifying the resources 130, and the connections between the resources 130, the provisioning manager 122 may generate the configuration data 114 and/or create the deployment template 125A. As discussed above, a deployment template, such as the deployment template 125A, may define the infrastructure of an application in a service provider network 120 and/or within other networks. In the current example, the deployment template 125A includes data describing the configuration of the resources 130 depicted in the picture 150A that is to be created in the service provider network 120. The illustrated deployment template 125A is simplified for purposes of explanation. For example, the deployment template 125A may include other data, such as parameters that define attributes of the resource, mappings that are used to identify items in the template, outputs that might be provided to the customer, or the like. The resources 130 might also include more or fewer properties.

As illustrated, the deployment template 125A includes a resources section 232A that includes a load balancer section 232B, an auto-scale server section 232C, a data store section 232D and a security section 232E. Each of the sections 232A-232E contained in the deployment template 125A is created from the identification of the resources 130 by the provisioning manager 122 using the picture 150A. In other examples, the provisioning manager 122 may include more information in the deployment template 125A that might not be depicted in the picture 150A. For example, the provisioning manager 122 might include one or more resources 130 that are needed in order to deploy the infrastructure that is depicted in the picture 150A.

After creating the deployment template 125A, the user might use the user interface 145 to interact with the configuration data 114 that is associated with the deployment template 125A. In some examples, a graphical illustration 240 might be created from the deployment template and shown to the user in the user interface 145. The user might compare the graphical illustration 240 to the picture 150A to determine whether the provisioning manager 122 analyzed the picture 150A correctly. As discussed above, the user interface 145 might also be used to change parameters associated with the resources 130, add/delete resources, and the like.

The deployment template 125A might be defined such that the provisioning manager 122, or some other component (e.g., the deployment component 126) may use the deployment template 125A to provision the depicted resources 130 in the service provider network 102 and/or instantiate the infrastructure in the service provider network 120.

Figure 3:
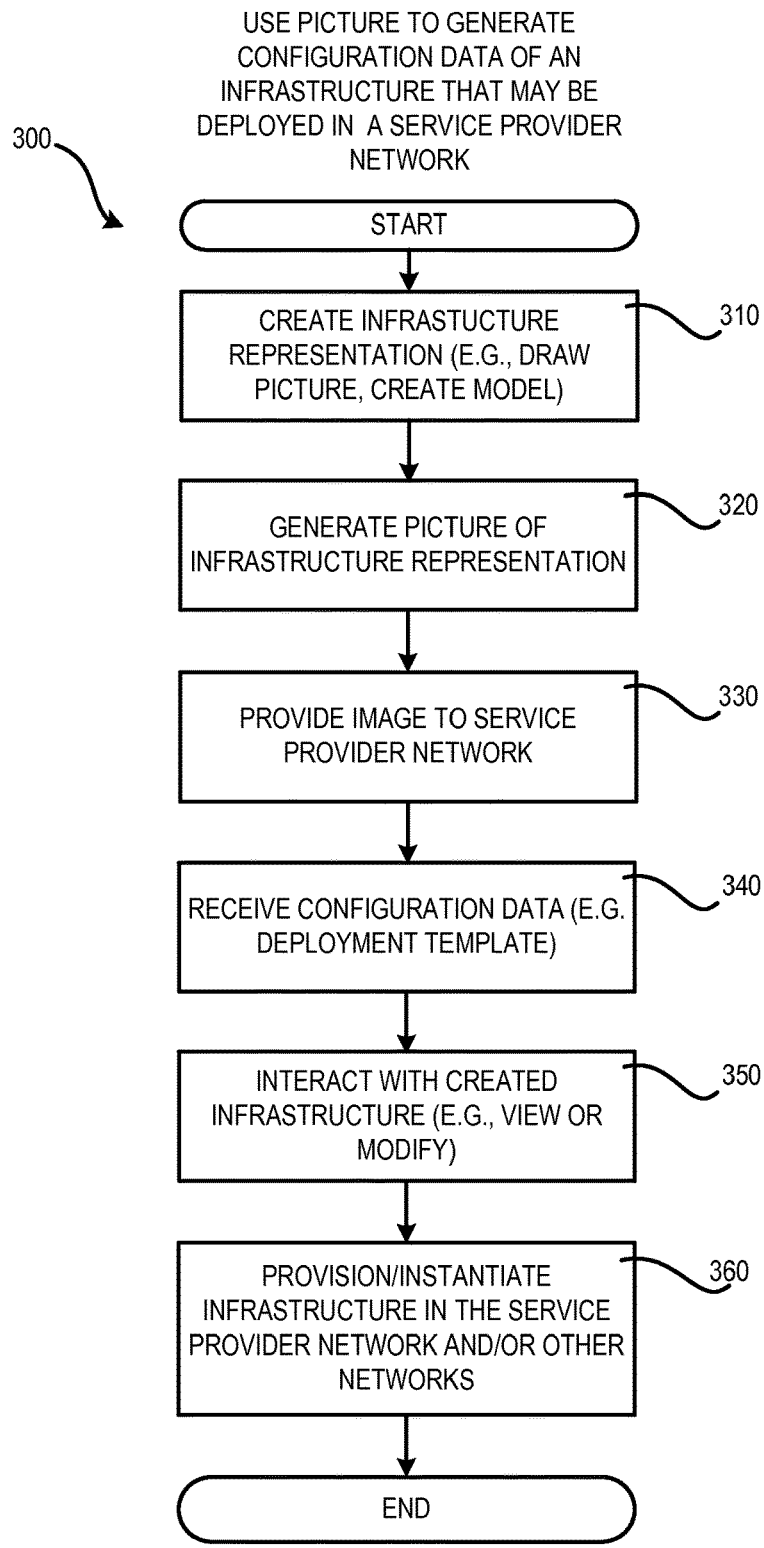
FIG. 3 is a flow diagram showing a routine illustrating aspects of a mechanism disclosed herein for using a picture to generate configuration data that defines an infrastructure that may be deployed in a service provider network.
Figure 4:
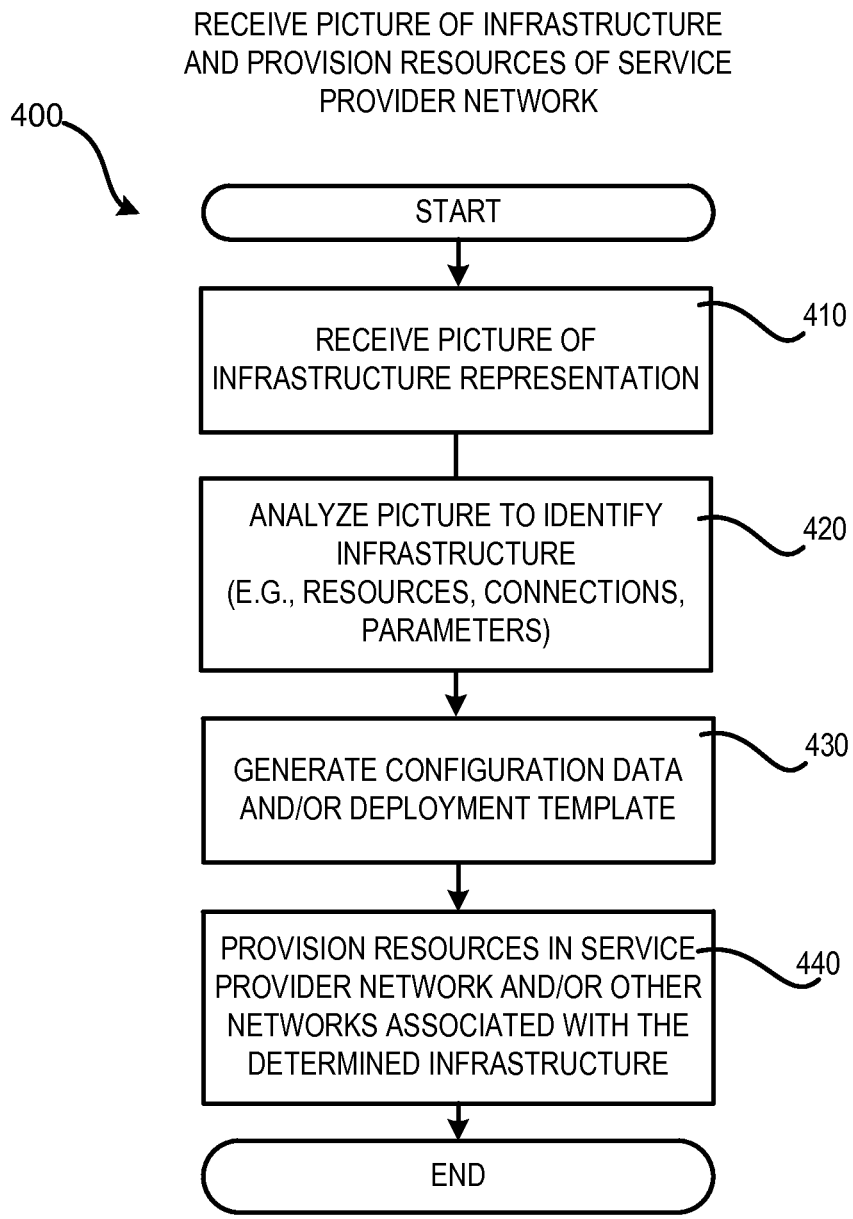
FIG. 4 is a flow diagram showing a routine illustrating aspects of a mechanism disclosed herein for receiving a picture of an infrastructure and using the picture to provision resources of the service provider network.
Figure 5:
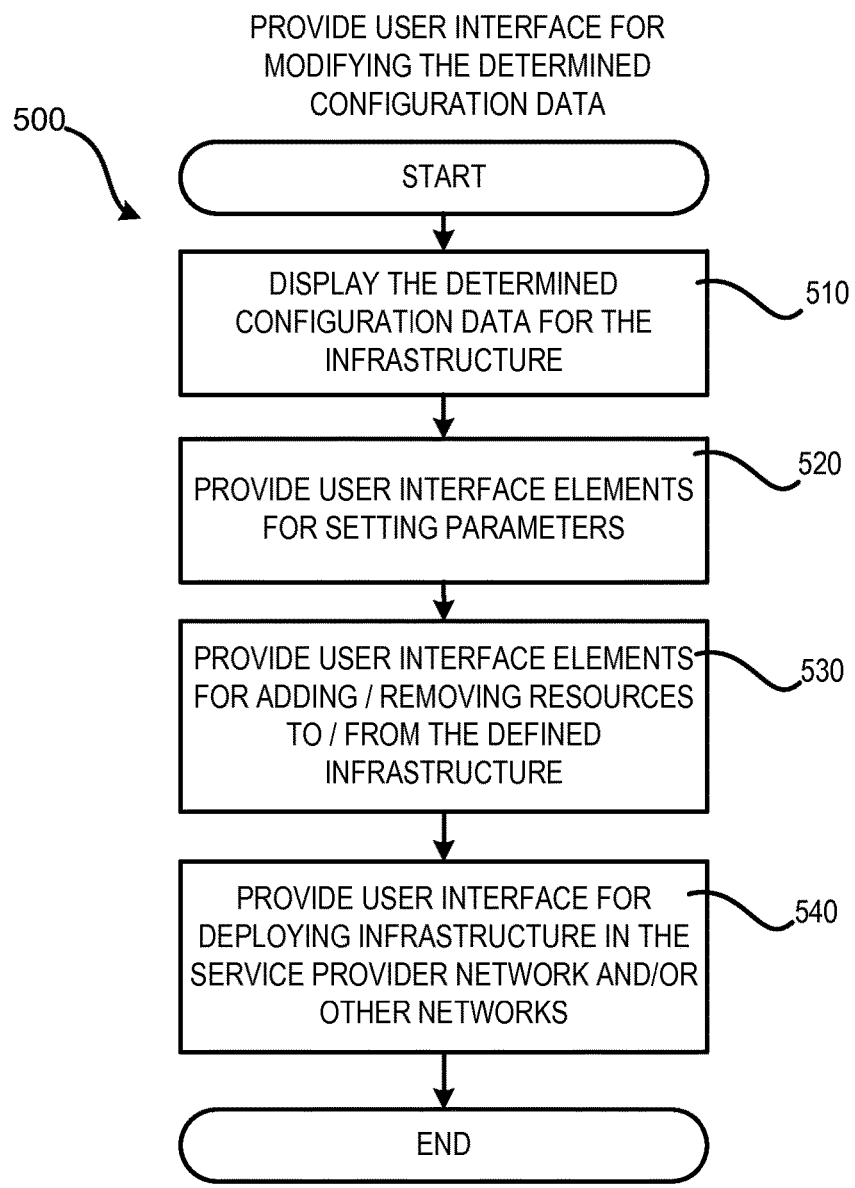
FIG. 5 is a flow diagram showing a routine illustrating aspects of a mechanism disclosed herein for providing a user interface that may be used to interact with configuration data that is associated with infrastructure depicted in a picture.

FIGS. 3-5 are flow diagrams showing routines that illustrate aspects of using a picture 150 of an infrastructure to generate configuration data that may be used to deploy the infrastructure in a service provider network 120, according to an aspect disclosed herein. It should be appreciated that the logical operations described herein with respect to FIGS. 3-5, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic and any combination thereof. It should also be appreciated that more or fewer operations may be performed than shown in the FIGS. and described herein. These operations may also be performed in parallel, or in a different order than those described herein.

FIG. 3 is a flow diagram showing a routine 300 illustrating aspects of a mechanism disclosed herein for using a picture to generate configuration data of an infrastructure that may be deployed in a service provider network 120. The routine 300 may begin at operation 310, where an infrastructure representation 148 is created. As discussed above, the infrastructure representation 148 may be a drawing (e.g., on a sheet of paper, on a whiteboard) or a model (e.g., building blocks) of infrastructure that is associated with an application configured to execute in the service provider network 120.

From operation 310, the routine 300 may proceed to operation 320, where a picture 150 of the infrastructure representation 148 is generated. For example, a customer may take a digital picture of the infrastructure representation 148 using a digital camera 164 or save a screenshot of a drawing that may be created using the customer computing device 140. The picture 150 might be generated using other mechanisms. For example, the user might scan the drawing using a scanning device to generate the picture 150.

From operation 320, the routine 300 may proceed to operation 330, where an image, such as the picture 150, may be provided (e.g., transmitted) to the service provider network 120. As discussed above, the picture 150 may be provided by the customer computing device 140 to the provisioning manager 122 that is associated with a configuration service 144. The provisioning manager 122 may analyze the picture 150 to create configuration data, and possibly a deployment template 125, that may be launched in the service provider network 120 and/or within another network.

From operation 330, the routine 300 may proceed to operation 340, where all or a portion of the configuration data 114 may be received by the customer using the computing device 140. As discussed above, the configuration data 114 might be used to create the deployment template 125 that is provided by the provisioning manager 122 and received by the customer computing device 140.

From operation 340, the routine 300 may proceed to operation 350, where the customer, or some other authorized user, may interact with data associated with the infrastructure generated using the picture 150. As discussed above, the customer might use the user interface 145 to make changes to the definition of the infrastructure. For example, the user interface 145 might be used to set one or more parameters for one or more of the resources 130 that are specified in the deployment template 125 and/or the configuration data. The user interface 145 might also be used to add or remove resources 130 from the determined infrastructure.

From operation 350, the routine 300 may proceed to operation 360, where the infrastructure may be provisioned and/or instantiated in the service provider network 120 and/or within other networks. As discussed above, the infrastructure might be provisioned and/or instantiated in the service provider network 120 and/or other networks using the provisioning manager 122, the deployment component 126, or some other computing device. The deployment component 126 may use the configuration as specified by the deployment template 125 to determine how to provision the resources 130 in the service provider network 120. The routine 300 then proceeds to an end operation.

FIG. 4 is a flow diagram showing a routine 400 illustrating aspects of a mechanism disclosed herein for receiving a picture of an infrastructure and using the picture to provision resources of the service provider network 120. The routine 400 may begin at operation 410, where a picture 150 of an infrastructure representation 148 is received. As discussed above, the picture 150 may be received from the customer computing device 140 and may be a digital picture that captures a drawing and/or a model that represents a desired infrastructure of an application for execution in the service provider network 120.

From operation 410, the routine 400 may flow to operation 420, where the picture 150 is analyzed to identify infrastructure that is depicted in the picture 150. As discussed above, the provisioning manager 122 utilizing the analyzer 230 might identify the depicted resources 130 from the picture 150. The analyzer 230 might use the mappings 116 when determining whether a depiction is a resource that is associated with the service provider network 120 and/or some other network. In some examples, the analyzer 230 detects depicted resources 130, parameters that may be associated with the resources 130, and the connections between the resources.

From operation 420, the routine 400 may proceed to operation 430, where the configuration data 114 and/or the deployment template 125 may be generated. As discussed above, the configuration data 114 and/or the deployment template 125 may be generated by the provisioning manager 122, the deployment component 126, or some other computing device.

From operation 430, the routine 400 may proceed to operation 440, where the resources 130 in the service provider network 120 and/or other networks may be provisioned and/or instantiated. As discussed above, the provisioning manager 122, the deployment component 126, or some other component or computing device, may provision and/or instantiate the resources 130 using the configuration data 114 and/or the deployment template 125 generated from the picture 150. The routine 400 then proceeds to an end operation.

FIG. 5 is a flow diagram showing a routine 500 illustrating aspects of a mechanism disclosed herein for providing a user interface that may be used to interact with configuration data 114 that is associated with the infrastructure depicted in the picture 150. As mentioned briefly above, although a UI is generally described below, other types of interfaces and/or mechanisms might be provided for allowing a user to view and/or modify the configuration data 114.

The routine 500 may begin at operation 510, where the configuration data 114 for the infrastructure may be displayed. For example, the UI 145 might be presented that displays the resources 130 and the connections between the resources 130 as determined from the infrastructure depicted from the picture 150. In some examples, the UI 145 might include a graphical illustration 240 that shows a graphical representation of the identified resources and connections between the resources.

From operation 510, the routine 500 may flow to operation 520, where user interface elements may be presented that allows a customer to interact with the configuration data 114 and/or the deployment template 125. In particular, the UI 145 elements might provide functionality for allowing a customer, or some other authorized user, to configure parameters that are associated with the different resources 130 specified by the configuration data 114.

From operation 520, the routine 500 may proceed to operation 530, where UI elements may be provided for allowing a user to add, delete, and/or modify resources 130 in the configuration data 114. For example, the customer might be permitted to add, delete, and/or modify virtual machine instances 172, firewalls, Internet gateways, load balancing devices, and/or other resources 130 in the configuration data 114.

From operation 530, the routine 500 may proceed to operation 540, where a UI 145 element might be provided for allowing a customer to provision and deploy the resources 130 identified in the configuration data 114 in the service provider network 120 and/or other networks. In this regard, it should be appreciated that functionality might be provided for allowing a user to specify other operational aspects not specifically mentioned above. From operation 540, the routine 500 proceeds to an end operation.

Figure 6:
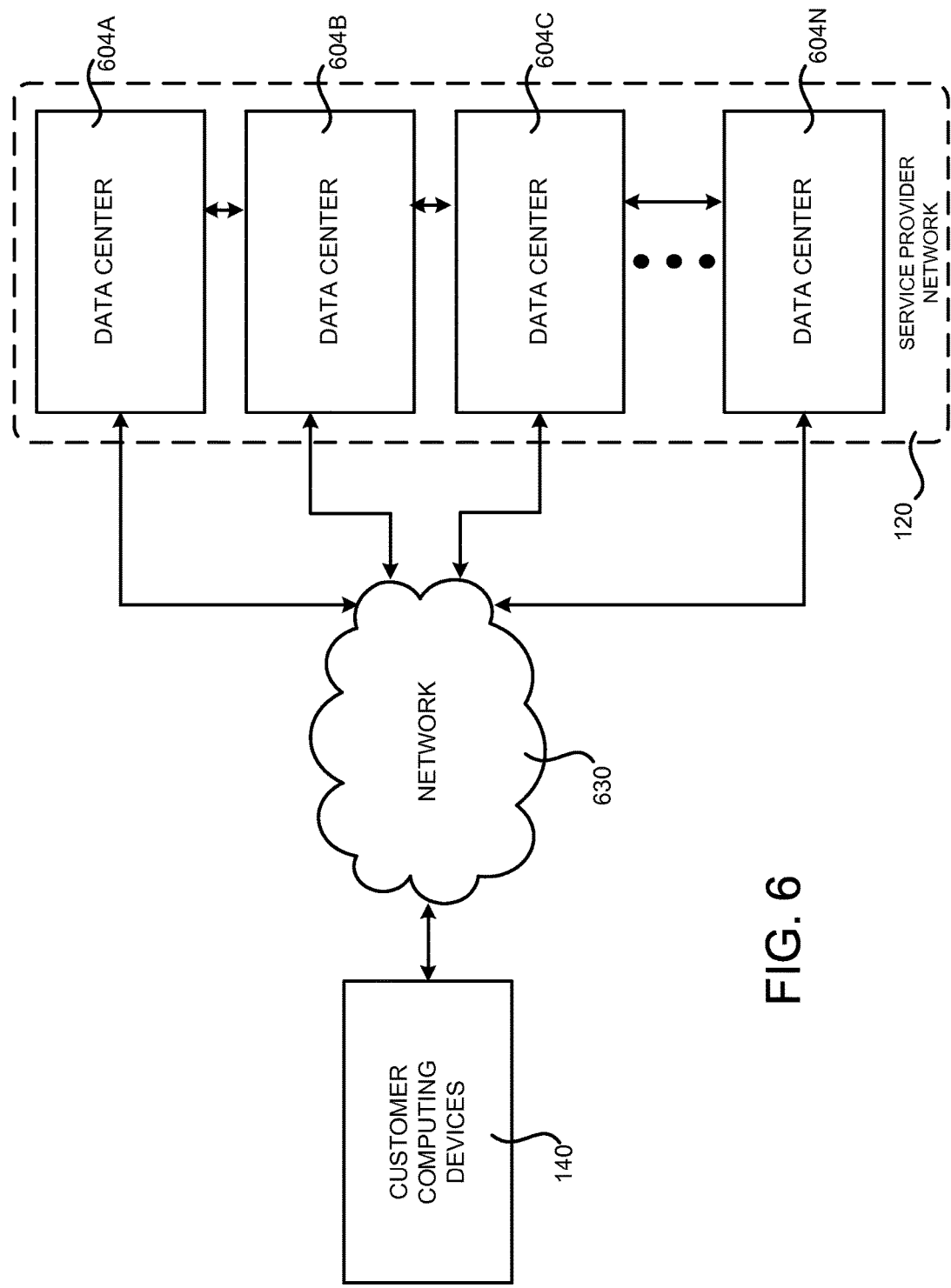
FIG. 6 is a system and network diagram that shows one illustrative operating environment for the technologies disclosed herein that includes a service provider network.

FIG. 6 and the following description are intended to provide a brief, general description of a suitable computing environment in which the technologies described herein may be implemented. In particular, FIG. 6 is a system and network diagram that shows an illustrative operating environment that includes a service provider network 120. As discussed above, the service provider network 120 can provide virtual machine instances 172, other execution environments, and computing resources 130 on a permanent or an as-needed basis.

The computing resources 130 provided by the service provider network 120 may include various types of resources, such as data processing resources, data storage resources, networking resources, data communication resources and the like. Each type of computing resource 130 may be general-purpose or may be available in a number of specific configurations. For example, and as will be described in greater detail below, data processing resources 130 may be available as containers or virtual machine instances 172 in a number of different configurations. The virtual machine instances 172 may be configured to execute applications, including Web servers, application servers, media servers, database servers and other types of applications. Data storage resources 130 may include file storage devices, block storage devices and the like. Each type or configuration of a virtual machine instance of a computing resource 130 may be available in different sizes, such as large resources, consisting of many processors, large amounts of memory, and/or large storage capacity, and small resources consisting of fewer processors, smaller amounts of memory and/or smaller storage capacity.

The computing resources 130 provided by the service provider network 120 are enabled in one implementation by one or more data centers 604A-604N (which may be referred to herein singularly as "a data center 604" or collectively as "the data centers 604"). The data centers 604 are facilities utilized to house and operate computer systems and associated components. The data centers 604 typically include redundant and backup power, communications, cooling and security systems. The data centers 604 might also be located in geographically disparate locations. One illustrative configuration for a data center 604 that implements some or all of the concepts and technologies disclosed herein for providing temporary access to resources in the service provider network 120 will be described below with regard to FIG. 7.

The users and customers of the service provider network 120 may access the computing resources provided by the data centers 604 over a suitable data communications network, such as a Wide Area Network ("WAN"), as illustrated by network 630. Although a WAN might be used, it should be appreciated that a local-area network ("LAN"), the Internet, or any other networking topology known in the art that connects the data centers 604 to the customer computing devices 140 may be utilized. It should also be appreciated that combinations of such networks might also be utilized.

Figure 7:
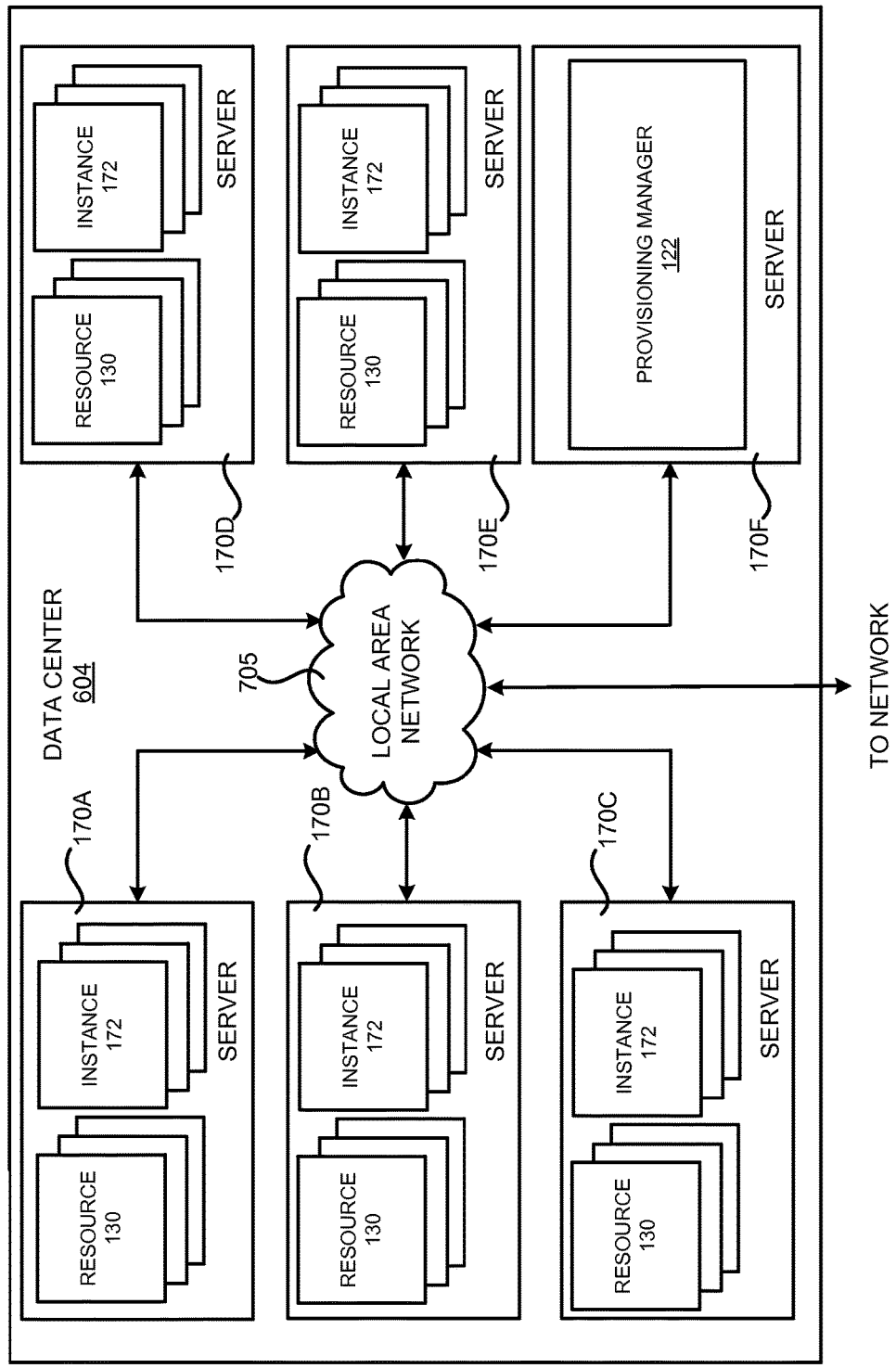
FIG. 7 is a computing system diagram that illustrates one configuration for a data center that implements aspects of a service provider network, including some or all of the concepts and technologies disclosed herein for using a picture to generate configuration data for an infrastructure depicted in the picture.

FIG. 7 is a computing system diagram that illustrates one configuration for a data center 604 that implements aspects of a service provider network 120, including some or all of the concepts and technologies disclosed herein for using a picture 150 to generate configuration data 114 for an infrastructure depicted in the picture 150. The example data center 604 shown in FIG. 7 includes several computers, such as servers 170A-170F (which may be referred to herein singularly as "a server computer 170" or in the plural as "the server computers 170") for providing computing resources 130. The server computers 170 may be standard tower or rack-mount server computers configured appropriately for providing the computing resources described herein. In one configuration the server computers 170 are configured to execute the software products as described above.

In one configuration, some of the computing resources 704 are the virtual machine instances 172 and the resources 130. As known in the art, a virtual machine instance is an instance of a software implementation of a machine (i.e. a computer) that executes programs like a physical machine. Each of the server computers 170 may be configured to execute an instance manager (not shown) capable of instantiating and managing resources 130 and VM instances 172. In the case of virtual machine instances, for example, the instance manager might be a hypervisor or another type of program configured to enable the execution of multiple virtual machine instances 172 on a single server computer 170, for example.

It should be appreciated that although the technologies disclosed herein are described primarily in the context of virtual machine instances, other types of computing resources can be utilized with the concepts and technologies disclosed herein. For instance, the technologies disclosed herein might be utilized with hardware resources, data storage resources, data communications resources, networking resources, database resources and with other types of computing resources.

The data center 604 shown in FIG. 7 also includes a server computer 170F reserved for executing software components for managing the operation of the data center 604, the server computers 170, virtual machine instances 172, and other resources 130 within the service provider network 120. The server computer 170F might also execute the provisioning manager 122. Details regarding the operation of this component have been provided above. In this regard, it should be appreciated that while these components are illustrated as executing within the service provider network 120, computing systems that are external to the service provider network 120 might also be utilized to execute some or all of these components. Other configurations might also be utilized.

In the example data center 604 shown in FIG. 7, an appropriate local area network ("LAN") 705 is utilized to interconnect the server computers 170A-170E and the server computer 170F. The LAN 705 is also connected to the network illustrated in FIG. 7. It should be appreciated that the configuration and network topology illustrated in FIGS. 6 and 7 has been greatly simplified and that many more computing systems, networks and networking devices may be utilized to interconnect the various computing systems disclosed herein. Appropriate load balancing devices or software modules might also be utilized for balancing a load between each of the data centers 604A-604N, between each of the server computers 170A-170F in each data center 604 and between virtual machine instances 172 and other types of computing resources 130 provided by the service provider network 120.

It should be appreciated that the data center 604 described in FIG. 7 is merely illustrative and that other implementations might also be utilized. Additionally, it should be appreciated that the functionality provided by these components might be implemented in software, hardware, or a combination of software and hardware. Other implementations should be apparent to those skilled in the art.

Figure 8:
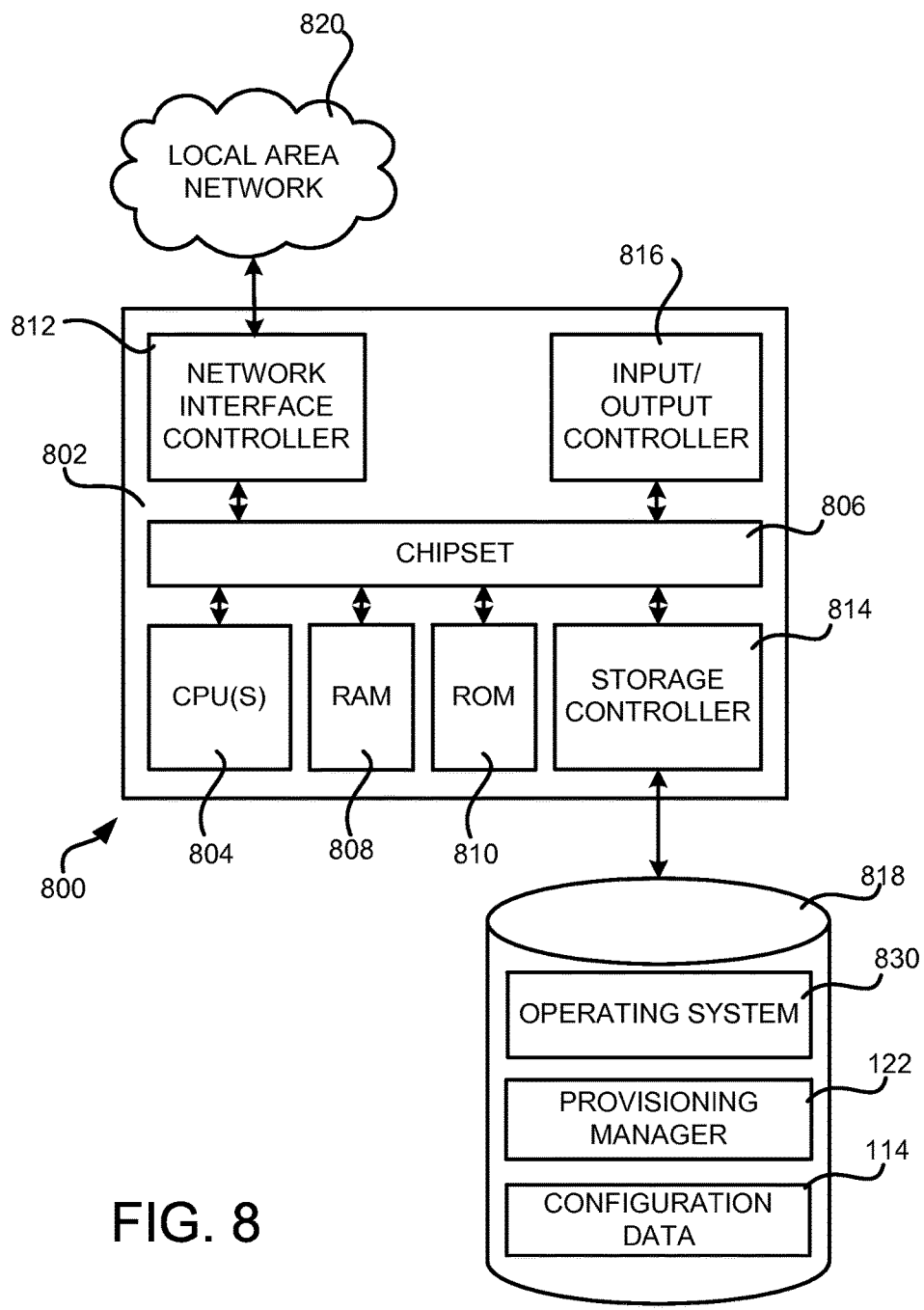
FIG. 8 is a computer architecture diagram showing one illustrative computer hardware architecture for implementing a computing device that might be utilized to implement aspects of the various technologies presented herein.

FIG. 8 shows an example computer architecture for a computer 800 capable of executing program components for using a picture 150 to generate configuration data 114 for a depicted infrastructure in the manner described above. The computer architecture shown in FIG. 8 illustrates a conventional server computer, workstation, desktop computer, laptop, tablet, network appliance, personal digital assistant ("PDA"), e-reader, digital cellular phone, or other computing device, and may be utilized to execute any of the software components presented herein. For example, the computer architecture shown in FIG. 8 may be utilized to execute software components for performing operations as described above. The computer architecture shown in FIG. 8 might also be utilized to implement a customer computing device 140, the server computers 170, the configuration service 144, or any other of the computing systems described herein.

The computer 800 includes a baseboard 802, or "motherboard," which is a printed circuit board to which a multitude of components or devices may be connected by way of a system bus or other electrical communication paths. In one illustrative configuration, one or more central processing units ("CPUs") 804 operate in conjunction with a chipset 806. The CPUs 804 may be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements may generally include electronic circuits that maintain one of two binary states, such as flip-flops and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

The chipset 806 provides an interface between the CPUs 804 and the remainder of the components and devices on the baseboard 802. The chipset 806 may provide an interface to a RAM 808, used as the main memory in the computer 800. The chipset 806 may further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM may also store other software components necessary for the operation of the computer 800.

The computer 800 may operate in a networked environment using logical connections to remote computing devices and computer systems through a network, such as the local area network 820. The chipset 806 may include functionality for providing network connectivity through a network interface controller ("NIC") 812, such as a gigabit Ethernet adapter. The NIC 812 is capable of connecting the computer 800 to other computing devices over the local area network 820. It should be appreciated that multiple NICs 812 may be present in the computer 800, connecting the computer to other types of networks and remote computer systems.

The computer 800 may be connected to a mass storage device 818 that provides non-volatile storage for the computer. The mass storage device 818 may store system programs, application programs, other program modules and data, which have been described in greater detail herein. The mass storage device 818 may be connected to the computer 800 through a storage controller 814 connected to the chipset 806. The mass storage device 818 may consist of one or more physical storage units. The storage controller 814 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 may store data on the mass storage device 818 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 818 is characterized as primary or secondary storage and the like.

For example, the computer 800 may store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the mass storage device 818 by detecting the physical states or characteristics of one or more particular locations within the physical storage units.

In addition to the mass storage device 818 described above, the computer 800 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 800.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 818 may store an operating system 830 utilized to control the operation of the computer 800. In one configuration, the operating system comprises the LINUX operating system. In another configuration, the operating system comprises the WINDOWS® SERVER operating system from MICROSOFT Corporation. In other configurations, the operating system may comprise the UNIX operating system. It should be appreciated that other operating systems may also be utilized. The mass storage device 818 may store other system or application programs and data utilized by the computer 800, such as components that include the provisioning manager 122, the configuration data 114 and/or any of the other software components and data described above. The mass storage device 818 might also store other programs and data not specifically identified herein.

In one configuration, the mass storage device 818 or other computer-readable storage media is encoded with computer-executable instructions which, when loaded into the computer 800, transform the computer from a general-purpose computing system into a special-purpose computer capable of implementing the technologies described herein. These computer-executable instructions transform the computer 800 by specifying how the CPUs 804 transition between states, as described above. In one configuration, the computer 800 has access to computer-readable storage media storing computer-executable instructions which, when executed by the computer 800, perform the various routines described above with regard to FIGS. 3-5. The computer 800 might also include computer-readable storage media for performing any of the other computer-implemented operations described herein.

The computer 800 may also include one or more input/output controllers 816 for receiving and processing input from a number of input devices, such as a keyboard, a mouse, a touchpad, a touch screen, an electronic stylus, or other type of input device. Similarly, the input/output controller 816 may provide output to a display, such as a computer monitor, a flat-panel display, a digital projector, a printer, a plotter, or other type of output device. It will be appreciated that the computer 800 may not include all of the components shown in FIG. 8, may include other components that are not explicitly shown in FIG. 8, or may utilize an architecture completely different than that shown in FIG. 8.

Based on the foregoing, it should be appreciated that technologies for using a picture 150 of an infrastructure to generate configuration data 114 usable in a service provider network 120 have been presented herein. Moreover, although the subject matter presented herein has been described in language specific to computer structural features, methodological acts and computer readable media, it is to be understood that the invention defined in the appended claims is not necessarily limited to the specific features, acts, or media described herein. Rather, the specific features, acts and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example configurations and applications illustrated and described, and without departing from the true spirit and scope of the present invention, which is set forth in the following claims.

What is claimed is:

1. A non-transitory computer-readable storage medium having computer-executable instructions stored thereupon which, when executed by a computer, cause the computer to:
   receive, from a computing device associated with a user of a service provider network, a picture that depicts an infrastructure that operates in the service provider network;
   detect resources that are depicted as graphical shapes in the picture that are provided by the service provider network, wherein detecting the resources includes to
   analyze the picture to identify a first graphical shape in the picture,
   identify a first resource that is provided by the service provider network based, at least in part, on the first graphical shape,
   analyze the picture to identify a second graphical shape in the picture, wherein the second graphical shape is different from the first graphical shape, and
   identify a second resource that is provided by the service provider network based, at least in part, on the second graphical shape;
   analyze the picture to detect connections between the resources, wherein the connections are depicted as graphical lines in the picture;
   determine that one or more parameters associated with the infrastructure are undetermined after analyzing the picture to identify one or more of the first graphical shape, the second graphical shape, or the connections between the resources;
   providing a user interface that provides functionality for obtaining the one or more parameters;
   generate configuration data that describes a configuration of the infrastructure within the service provider network, the configuration data generated at least, in part, on the detected resources, the detected connections, and the one or more parameters; and
   perform one or more actions using the configuration data.

2. The non-transitory computer-readable storage medium of claim 1, wherein performing the one or more actions using the configuration data comprises generating a deployment template using the configuration data.

3. The non-transitory computer-readable storage medium of claim 1, wherein performing the one or more actions using the configuration data comprises providing the user interface that provides functionality for modifying the configuration data.

4. The non-transitory computer-readable storage medium of claim 3, wherein the user interface is further configured to provide functionality for receiving parameters that further define one or more of the resources.

5. The non-transitory computer-readable storage medium of claim 3, wherein the resources comprise one or more of a virtual computing resource, a database resource, a storage resource, a security resource, an auto-scale resource, or a networking resource.

6. The non-transitory computer-readable storage medium of claim 1, wherein performing the one or more actions using the configuration data comprises provisioning the infrastructure in one or more of the service provider network and a second network.

7. A system, comprising:
   one or more computers configured to
      analyze an image, that depicts an infrastructure that operates in a service provider network, obtained from a customer of the service provider network to identify resources including a first resource and a second resource to provision in one or more of the service provider network and a second network, wherein the first resource is depicted as a first graphical shape and the second resource is depicted as a second graphical shape within the image;
      provide a user interface that provides functionality for obtaining one or more parameters that remain undetermined after analyzing the image;
      generate configuration data, based at least on analyzing the image and the one or more parameters, describing a configuration of the first resource and the second resource within the one or more of the service provider network and the second network; and
      perform one or more actions using the configuration data.

8. The system of claim 7, wherein performing the one or more actions using the configuration data comprises providing the configuration data to a deployment component configured to utilize the configuration data to provision the resources.

9. The system of claim 7, wherein performing the one or more actions using the configuration data comprises generating a deployment template using the configuration data.

10. The system of claim 7, wherein the one or more computers are further configured to analyze the image for at least one connection between the resources depicted in the image, wherein the at least one connection is a graphical element.

11. The system of claim 7, wherein analyzing the image includes identifying a symbol in the image and setting at least one parameter for at least one of the resources to a value identified by the symbol.

12. The system of claim 7, wherein the one or more computers are further configured to provide a user interface for modifying the configuration data.

13. The system of claim 7, wherein the one or more computers are further configured to cause one or more virtual machine instances to be launched based, at least in part, on the configuration data.

14. The system of claim 7, wherein the one or more computers are further configured to receive the image from a customer computing device, wherein the image is an electronic image of a model, a diagram, or a screenshot.

15. A computer-implemented method, comprising:
   analyzing an image, that depicts an infrastructure that operates in a service provider network, obtained from a customer of the service provider network to identify resources, including a first resource and a second resource, to provision in one or more of the service provider network and a second network, wherein the first resource depicted within the image is associated with a first color and the second resource depicted in the image is associated with a second color;
   providing a user interface that provides functionality for obtaining one or more parameters that remain undetermined after analyzing the image;
   generating configuration data, based at least on analyzing the image and the one or more parameters, describing a configuration of the resources within the one or more of the service provider network and the second network; and
   performing one or more actions using the configuration data.

16. The computer-implemented method of claim 15, wherein performing the one or more actions using the configuration data comprises generating a deployment template.

17. The computer-implemented method of claim 16, further comprising provisioning resources using the deployment template.

18. The computer-implemented method of claim 15, further comprising analyzing the image to determine graphical connections that are used to connect the resources.

19. The computer-implemented method of claim 15, wherein analyzing the image includes identifying parameters in the image based, at least in part, on symbols in the image that are associated with one or more of the resources.

20. The computer-implemented method of claim 15, wherein performing the one or more actions comprises providing a user interface for modifying the configuration data.

* * * * *